US012127498B2

(12) United States Patent
Missotten et al.

(10) Patent No.: US 12,127,498 B2
(45) Date of Patent: Oct. 29, 2024

(54) BELT-TYPE CUTTING SYSTEM COMPRISING KNIVES FOR CUTTING CROPS, INCLUDING MEANS FOR MONITORING THE CONDITION OF THE KNIVES

(71) Applicant: CNH Industrial America LLC, New Holland, PA (US)

(72) Inventors: Bart M. A. Missotten, Herent (BE); Jasper Vanlerberghe, Aartrijke (BE); Sam Reubens, Sint-Michiels (BE); Lucas Deruyter, Hooglede-Gits (BE); Frederik Tallir, Esen (BE); Dré W. J. Jongmans, AG Klundert (NL); Sahand Hajshekoleslami, Izegem (BE); Pieter Van Overschelde, Sint-Andries (BE)

(73) Assignee: CNH Industrial America LLC, New Holland, PA (US)

( * ) Notice: Subject to any disclaimer, the term of this patent is extended or adjusted under 35 U.S.C. 154(b) by 272 days.

(21) Appl. No.: 17/841,948

(22) Filed: Jun. 16, 2022

(65) Prior Publication Data
US 2022/0400607 A1 Dec. 22, 2022

(30) Foreign Application Priority Data

Jun. 17, 2021 (EP) ..................... 21180157

(51) Int. Cl.
*A01D 34/00* (2006.01)
*A01D 34/04* (2006.01)
(Continued)

(52) U.S. Cl.
CPC ........... *A01D 34/006* (2013.01); *A01D 34/04* (2013.01); *G01J 5/0859* (2013.01); *A01D 34/145* (2013.01); *A01D 41/127* (2013.01)

(58) Field of Classification Search
CPC .... A01D 34/006; A01D 34/04; A01D 34/145; A01D 34/30; A01D 34/831; A01D 34/83; A01D 34/833; A01D 41/127; G01J 5/0859
See application file for complete search history.

(56) References Cited

U.S. PATENT DOCUMENTS 4,070,810 A * 1/1978 Brakke .................. A01D 34/38
56/291
4,656,819 A * 4/1987 Pearson ............... A01D 34/833
56/291
(Continued)

FOREIGN PATENT DOCUMENTS

CN 110050573 A * 7/2019
DE 4201045 A1 * 7/1993 ........... A01D 34/833
(Continued)

OTHER PUBLICATIONS

Extended European Search Report for European Application No. 211 801 57.6, dated Dec. 13, 2021, 9 pages.

*Primary Examiner* — Michael J Zanelli
(74) *Attorney, Agent, or Firm* — Peter K. Zacharias; Rebecca L. Henkel; Rickard K. DeMille

(57) ABSTRACT

A cutting system includes knives attached to a continuously moving belt-type carrier. The carrier motion moves the knives past stationary counterknife fingers which are attached to or uniform with a cutterbar, as the cutting system is driven through a field of crop stalks, which are cut by the interaction between the knives and counterknives. One or more sensing devices produce signals or images related to the condition of the knives when the knives are moving past the sensing devices. A processing unit processes the signals or images and derives therefrom one or more parameters representative of the condition of the knives, and compares the parameters to a reference, to thereby monitor the condition of the knives.

(Continued)

dition. An agricultural implement such as a combine harvester, can be equipped with the cutting system.

14 Claims, 4 Drawing Sheets

(51) Int. Cl.
  *A01D 34/14* (2006.01)
  *A01D 41/127* (2006.01)
  *G01J 5/08* (2022.01)

(56) References Cited

U.S. PATENT DOCUMENTS

| | | |
|---|---|---|
| 5,732,539 A | 3/1998 | Loftus |
| 2021/0045288 A1 | 2/2021 | Sorensen |

FOREIGN PATENT DOCUMENTS

| | | | |
|---|---|---|---|
| EP | 0492029 B1 | | 11/1992 |
| FR | 2315223 A2 | | 1/1977 |
| RU | 2609907 C1 | * | 2/2017 |
| RU | 2729492 C1 | * | 8/2020 |

\* cited by examiner

BELT-TYPE CUTTING SYSTEM COMPRISING KNIVES FOR CUTTING CROPS, INCLUDING MEANS FOR MONITORING THE CONDITION OF THE KNIVES

CROSS-REFERENCE TO RELATED APPLICATION

This application claims priority to European Application No. 21180157.6, filed Jun. 17, 2021, the content of such application being incorporated by reference herein in its entirety.

FIELD OF THE INVENTION

The present invention is related to agricultural implements, such as harvesters or mowers equipped with a cutter bar and a set of knives moving sideways relative to the cutterbar to cut off crop stalks close to the ground level. This type of knife-cutterbar combination is commonly used in combine harvesters.

BACKGROUND OF THE INVENTION

In a combine harvester, the cutter bar and knives are part of the combine header mounted at the front of the machine and configured to cut and collect crops along a wide path, the width thereof corresponding to the length of the header. In most harvesters known today, the knives are configured to undergo a reciprocating movement relative to the cutterbar, the latter being equipped with stationary fingers acting as counterknives. The reciprocating movement of the knives is actuated by a laterally placed actuator such as a wobble box mechanism. While this is a well-known and well-tested cutting method, the reciprocating motion has a number of disadvantages. The system is subject to vibrations and high peak forces which are liable to cause premature wear of the knives and/or the counterknives or of the actuating mechanism itself. These forces may become excessive, especially in the increasingly large harvesters in use today.

A known alternative to the reciprocating knives is the so-called belt cutter or loop-knife approach, in which the knives are mounted on a continuously moving belt-type carrier, moving along the front edge of the header. The belt is guided by a set of pulleys, one of which is actively rotated at a given speed. The knives move in one direction, once again relative to stationary counterknives, along the front side of the carrier's path, and move in the opposite direction (i.e. in a loop) along the back side of said path. While vibrations and peak forces are much less of an issue here, the loop-knife solution is vulnerable to other problems. The main problem is the breaking of knives when an obstruction is encountered in the field, such as a large stone or other solid object.

In presently known loop-knife systems, such breaking of knives deteriorates the cutting performance, especially as such defects may remain undetected during a harvesting run. Not only the large defects due to breaking of knives go undetected in this way, but this is the case also for smaller defects or for the failure of knives due to excessive wear.

SUMMARY OF THE INVENTION

The invention is related to a cutting system and to an agricultural implement such as a combine harvester equipped therewith, as described in the appended claims.

The cutting system of the invention is of the above-described loop-knife type, with knives attached to a continuously moving belt-type carrier. The term 'belt-type carrier' includes a belt as such, as well as a chain or other carrier that is equivalent to a belt. A preferred embodiment includes a belt with a planar outer side surface to which the knives are attached, and teeth on its inner side surface, the teeth interacting with pulleys for guiding and driving the belt motion. The belt motion moves the knives past stationary counterknife fingers which are attached to or uniform with a cutterbar, as the cutting system is driven through a field of crop stalks, which are cut by the interaction between the knives and counterknives. A cutting system of the invention includes one or more sensing devices configured to produce signals or images related to the condition of the knives when the knives are moving past the sensing devices. The sensing device can be configured to produce signals or images relating to the condition of every knife moving past the sensing device, or at regular time intervals, or in a random matter. The cutting system might include a knife position sensing system enabling to link the signals or images to specific knives. For example, by adding an identification to one knife which can be detected at the sensing device position, and measuring the speed of the belt, the signal or image produced by the sensing device can be linked to a specific knife, so the condition of a specific knife can be known. The system further includes a processing unit configured to process the signals or images and derive therefrom one or more parameters representative of the condition of the knives, and to compare these parameters to a reference, to thereby monitor said condition. The invention is related also to an agricultural implement such as a combine harvester, equipped with a cutting system according to the invention.

The invention enables a timely determination of wear or damage to the knives in a loop-knife cutting system, so that damaged knives may be replaced before a significant deterioration of the cutting performance occurs. The system also allows long term monitoring of the knife condition, enabling the detection of wear and the efficient planning of maintenance and review of the cutting system.

BRIEF DESCRIPTION OF THE DRAWING FIGURES

FIG. 5b illustrates the shape of a signal obtainable by the sensor shown in FIG. 5a.

FIGS. 6b to 6d illustrate the respective shapes of signals obtainable by the three sensors shown in FIG. 6a.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The invention is described in the context of a combine harvester, but is not limited to this particular context, as will be explained further. The terms 'front' and 'back' or 'rear' are referenced to the front and back side of a combine harvester. The 'forward direction' of the combine harvester refers not to a single geometrical axis but to the general direction from the rear of the vehicle to the front.

Figure 1:
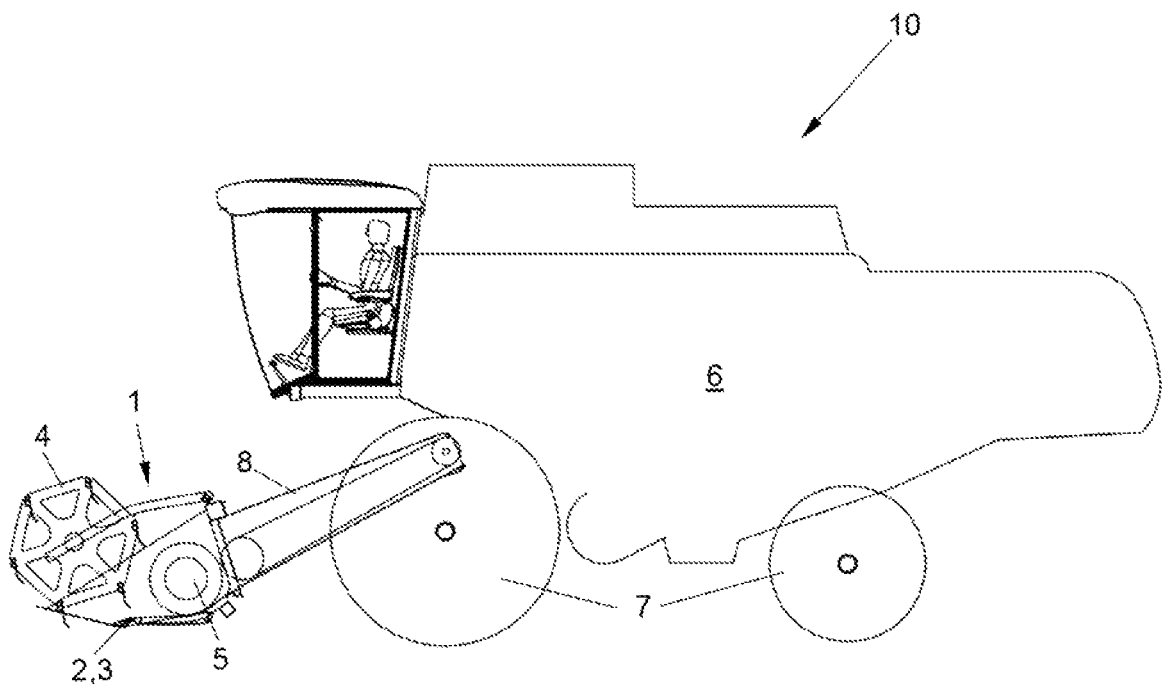
FIG. 1 is a schematic image of a combine harvester, illustrating the position of the knives and cutterbar at the front of the combine header.

FIG. 1 is a schematic image of a combine harvester 10 as known today, comprising a header 1 mounted at the front of the combine. The position of the knives 2 and the cutterbar 3 is indicated in the drawing, without distinguishing these elements (more detailed drawings will be referred to later). The knives and the cutterbar are maintained at a given height above ground level while the combine 10 moves through a field of crops that are to be harvested. A rotating reel 4 guides the crops towards the knives. Cut crops are transported from both lateral sides of the header 1 towards a central area by an auger 5. The main body 6 of the combine is supported by front and rear wheels 7 and comprises the threshing rotors and a cleaning section generally known by the skilled reader and not depicted as such in FIG. 1. From the central area of the header 1, crops are transported into the main body 6 of the combine by a feeder 8, also known as such and not described here in detail.

Figure 2:
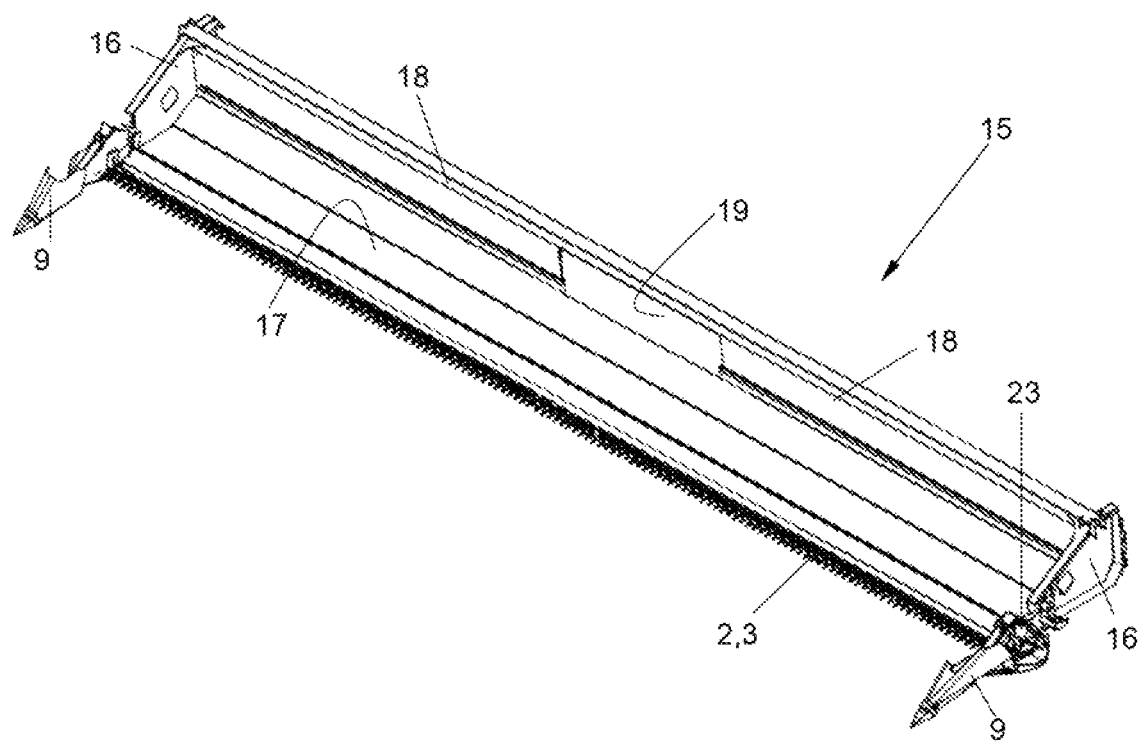
FIG. 2 shows a header frame provided with a loop-knife cutting system.
Figure 3:
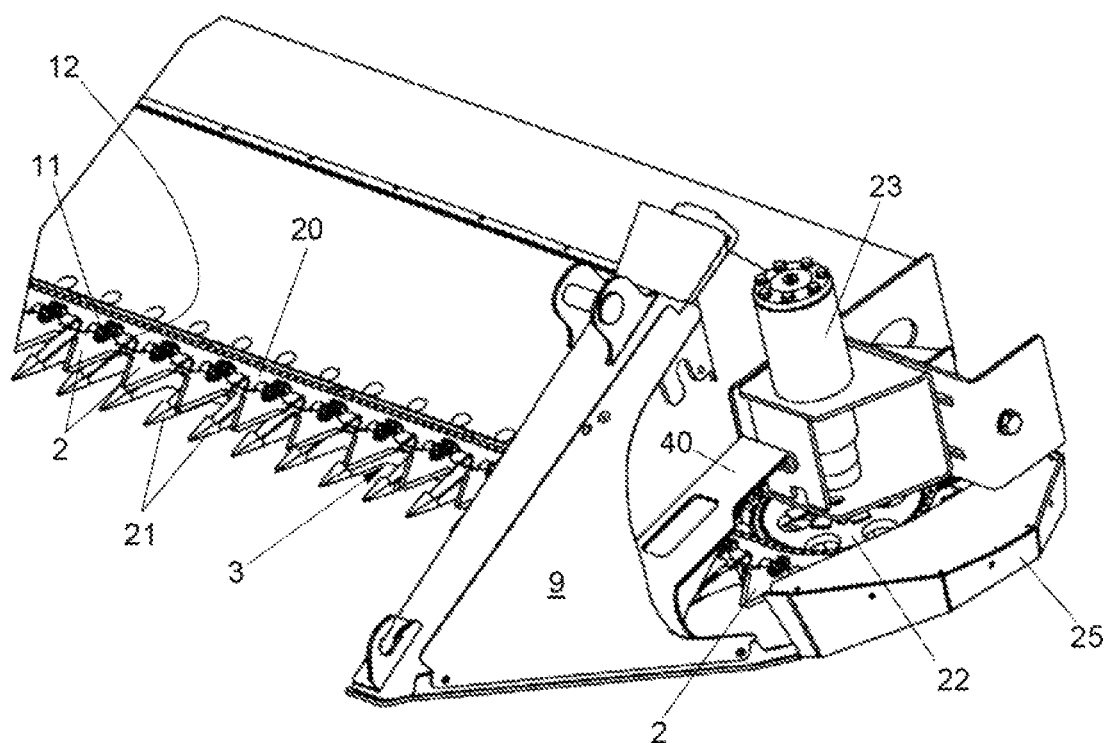
FIG. 3 is a detail of one side of a header frame similar to the one shown in FIG. 2.

A more detailed image of a header frame 15 provided with a loop-knife cutting system is shown in FIGS. 2 and 3. The frame 15 comprises sidewalls 16, a header floor 17 and a back wall 18. The back wall 18 comprises a central opening 19 through which crops are transferred to the feeder, when the header is attached thereto. The knives 2 and the cutterbar 3 extend between laterally placed dividers 9 along the full length of the header, at the front edge of the header floor 17. FIG. 3 shows a detailed image of one side of a similar header frame (only the shape of the divider 9 is slightly different from the frame shown in FIG. 2). In this image, the knives 2 and the cutterbar 3 can be clearly distinguished. The term 'cutterbar' is used herein to refer to an assembly of elements which are rigidly connected together. The cutterbar 3 comprises counterknife fingers 21 protruding in the forward direction. In the embodiment shown, the knives 2 are triangular steel knives mounted on respective support brackets 11 by a bolt connection 12, and these brackets 11 are attached to a lateral surface of the belt 20. Any other known way of attaching the knives 2 to the belt 20 or to an equivalent continuously moving carrier is however applicable within the scope of the present invention.

As the knives 2 are attached to the belt 20, they are able to move continuously past the stationary fingers 21 of the cutterbar 3, to thereby cut crop stalks in the field. The belt 20 is guided by a pair of pulleys 22, one of which is driven actively by a belt drive mechanism comprising an actuator 23. The details of the drive mechanism for the belt 20 are not shown, nor are they relevant for defining the scope of the present invention. Any suitable mechanism, for example known from loop-knife cutting systems that are in use today, is applicable. The actuator 23 may for example be a hydraulic motor or an electric motor, coupled to a respective hydraulic or electric power source of the combine harvester.

As seen in FIG. 3, a protective housing 25 is formed around the knives 2, at the location where they make the 180° turn along the circumference of the pulley 22. This housing 25 is one possible location for placing a sensing device in a cutting system according to the invention. Other locations are possible and the invention is not limited to headers including the housing 25. This particular header design is therefore used merely as an example of a possible way of implementing a sensing device in accordance with the invention.

Figure 4:
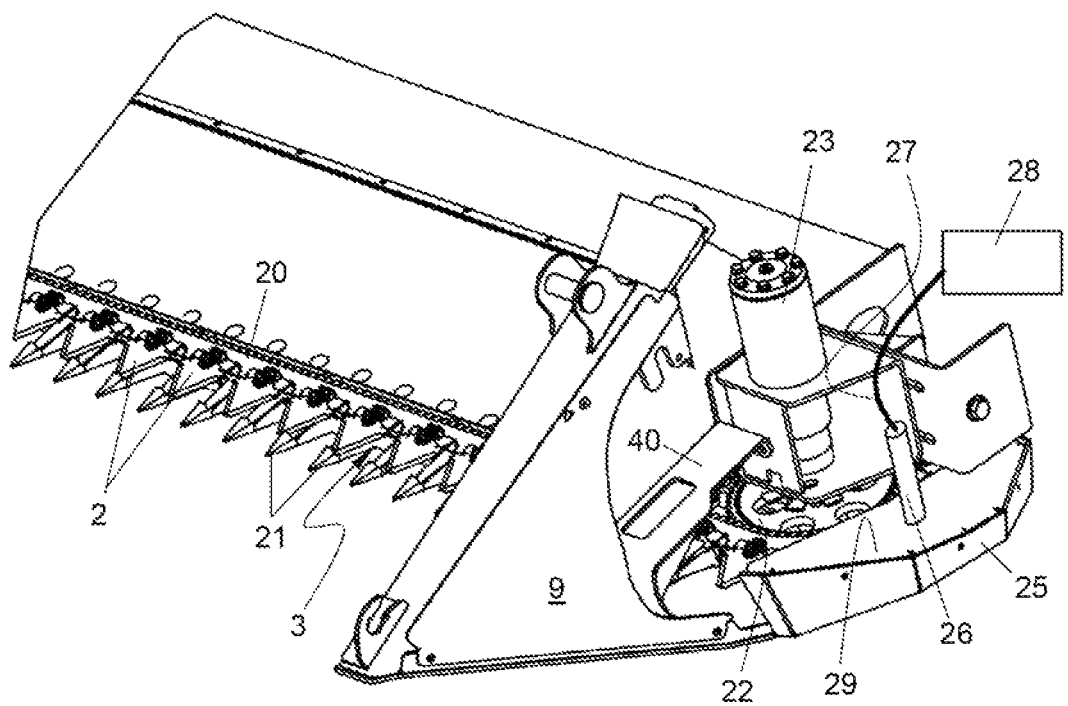
FIG. 4 shows the header frame of FIG. 3, equipped with a sensor for monitoring the knife condition.

FIG. 4 illustrates a sensor 26 mounted on the lateral housing 25. The sensor 26 is represented in a simplified way as a cylinder, in order to indicate the general location of the sensor, given that various sensor types may be used within the scope of the invention, as will be explained hereafter. The way in which the sensor 26 is attached to the housing 25 is not shown in detail, as suitable attachment means are equally well-known in the art for the various types of sensors that are applicable within the invention scope. An electric wire connection 27 is shown to indicate the way in which a measurement signal issues from the sensor 26 and is transmitted to a processing unit 28. Other types of connections may be used depending on the sensor type, such as wireless connections. An opening is made in the upper surface 29 of the housing 25 and the sensor 26 is mounted in said opening, so that the knives 2 pass in front of a sensing surface of the sensor 26.

Figure 5A:
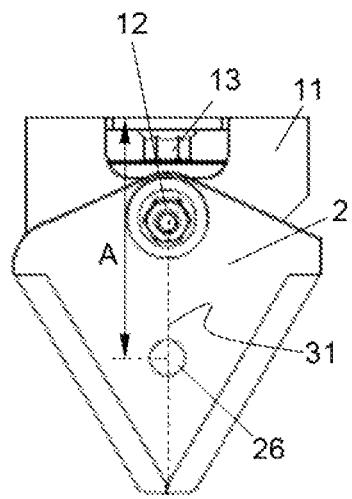
FIG. 5a illustrates the position of a sensor relative to one of the knives.

As stated, the sensor 26 may be one of various sensor types. A first suitable sensor type is an inductive proximity sensor, configured to detect the presence of a metal surface passing in front of the sensor. This type of sensor is known as such and its principle of operation need therefore not be described here in detail. The sensing surface of the inductive sensor is placed at a suitable distance, for example about 0.5 cm, from the planar upper surface of the knives 2 as they make the 180° turn. Inductive sensors react very quickly so that the signal obtained from this type of sensor is suitable for monitoring the condition of the knives essentially in real time. FIG. 5a shows a top view of one knife 2, attached via the bolt connection 12 to the bracket 11, the latter being fixed to the side of the belt (not shown) by a further bolt connection 13. The way in which the knife 2 is coupled to the bracket 11 is however not determined within the scope of the present invention. This may be a rigid coupling or a flexible coupling, or any other type of suitable coupling. The inductive sensor 26 is shown in FIG. 5a at the instant when the centre line 31 of the knife 2 passes before the sensor. The sensor 26 is located at a distance A from the belt. This distance A is the same for each knife that passes the sensor.

Figure 5B:
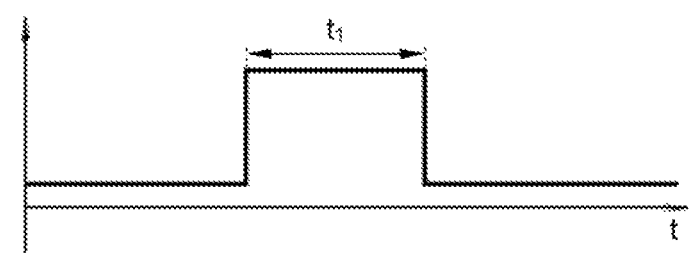

As illustrated in FIG. 5b, the output signal of the sensor 26 represents a block as a function of time, with a given length $t_1$ when the knife 2 passes in front of the sensor. In the image shown, the signal is represented as a rectangular block without specifying the value and units of the signal as such (this may be a voltage indicated on a suitable scale determined by the measuring equipment). This schematic representation is shown merely to indicate the general appearance of the signal. In reality, the signal will not be a geometric rectangle, due to noise and to the non-zero reaction time inherent to the sensor 26. However, the signal obtained by an inductive sensor is sufficiently close to the signal shown in the drawing to allow to determine the time $t_1$ in a way that is the same for each knife 2, possibly after performing a number of signal processing steps (noise reduction for example).

The value of $t_1$ is a function of the speed of the belt and the width of the knife 2 at the sensor location. Therefore, when the knife is not damaged and not worn, the value of $t_1$ is well-known and may therefore serve as a reference. Any significant deviation from this reference indicates a form of damage of the knife. When the measured length $t_1$ deteriorates over time, this is likely to indicate wear of the knife. When the length $t_1$ changes abruptly or when the signal falls away, this indicates a sudden grave damage to a knife, such as full or partial breakage of the knife, likely as a consequence of encountering a large obstruction in the field.

The signal monitoring is done with the help of a suitable processing unit 28 coupled to the sensor 26 via connection 27. This unit is shown only symbolically as a rectangle in FIG. 4. Any processing unit known as such in the art for monitoring the output of an inductive sensor (or other sensors applicable in the invention, see further) may be used. This unit may be incorporated in a control unit of an agricultural implement such as a combine harvester equipped with a cutting system of the invention. The processing unit 28 is configured to receive a signal from the sensor 26, process the signal and derive therefrom one or more parameters indicative of the condition of each knife, such as the presence of a rectangular block and the length $t_1$ of said rectangular block. The state of wear of a knife might be determined as 1 minus the ratio of the measured length $t_1$ minus the worn out length tw, divided by the initial length minus the worn out length tw. The worn out length tw can be set by the operator as the minimum length required for cutting. The initial length can be set by the operator, or can be measured by the sensor 26 after mounting a new set of knives. The average state of wear can be calculated as the average of the state of wear of a number of knives.

Other sensing devices may enable to derive other parameters. For example a camera (see further) may enable to derive additional information on the shape of the knives so that the extent of damage or wear may be assessed in a more detailed way. The processing unit 28 is furthermore configured to compare the derived parameters to reference values (such as the reference value for $t_1$ for a non-damaged knife), and produce a result of the comparison that can be interpreted by an operator of the system. This may for example be done in the form of an auditive signal indicating damage to the knives that requires stopping and reviewing the cutting system. Producing such a signal may be based on the degree of damage to individual knives as well as on the number of knives to which a given degree of damage has been detected. Preferably, the result of the comparison is reported on a visual interface, so that the knife condition (degree of damage, number of knives damaged/worn) may be continuously checked by the operator. In a combine harvester, such an interface is present in the driver's cabin. The interface preferably comprises input means allowing the operator to set thresholds in terms of the values of the parameters derived from the detected signals or images, and/or in terms of the number of knives to which a given degree of damage may be allowed before a warning signal is given.

According to some embodiments, the knife condition of specific knifes is reported on the visual interface. The belt might be shown on the visual interface with colour coding indicating the condition of knives.

According to some embodiments, the system may be stopped automatically when it is detected that a pre-defined degree of damage is reached or exceeded.

According to some embodiments, the system may report an estimated remaining life time of the knifes, for example by estimating when the average state of wear will be equal to the worn out state, which is the state when average measured length equals the worn out length, based on the evolution of the average state of wear over time.

The processing unit 28 may comprise or be connected to a memory wherein a history of the knife condition may be stored, enabling long term monitoring of wear of the knives, so that maintenance and review can be planned in an efficient way. The operator interpreting or checking the results, can also be outside of the driver's cabin. In particular, an operator can interpret or check the results remotely, for example in case of a remotely controlled combine or in case of an autonomous combine. When the operator is outside of the driver's cabin, the results can be communicated to him directly, for example via a network to his computer or via a wireless connection to a wireless device, or indirectly, for example via a cloud service.

Figure 6A:
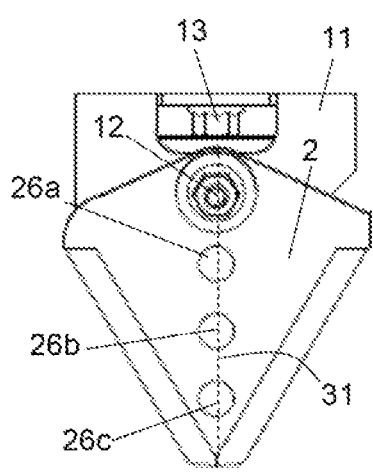
FIG. 6a illustrates the position of three sensors positioned relative to the same knife.
Figure 6B:
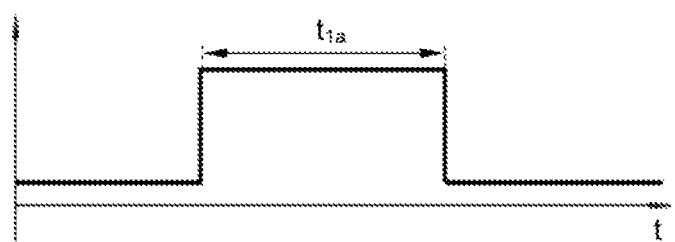
Figure 6C:
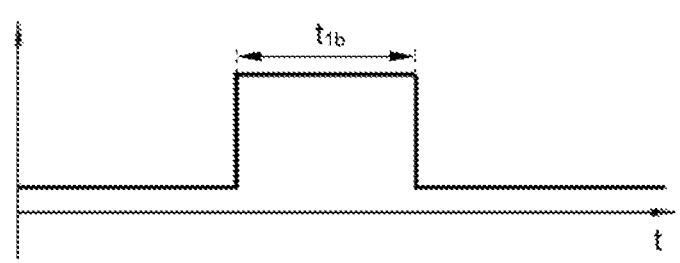
Figure 6D:
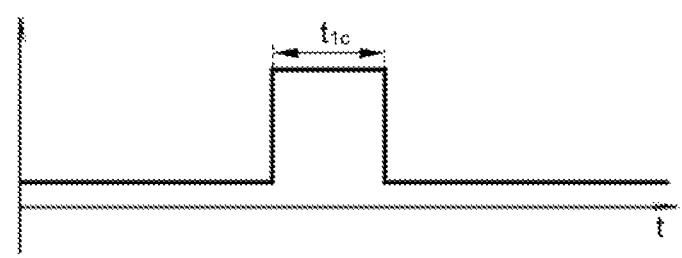

According to an embodiment, multiple sensors are mounted at various positions relative to the surface of each passing knife. This is illustrated in FIG. 6a. Three inductive sensors 26a, 26b and 26c are mounted at three positions along the centre line 31 of the knife 2, as it passes in front of the three sensors. For a knife that is not damaged, and with reference to FIGS. 6b to 6d, the blocks measured by the three sensors have a different length $t_{1a}$, $t_{1b}$ and $t_{1c}$ due to the difference in the knife's width at the three positions. Therefore the monitoring may be done on the basis of three respective reference values for the three positions. Breakage or wear of the knives can thereby be monitored in a more accurate way, enabling an improved assessment of the degree of damage or wear that is detected. Depending on the dimensions of the sensors used and of the knives, the number of sensors may be further increased.

An alternative to the inductive sensor but measuring essentially the same type of signal in the form a block having a given length $t_1$ corresponding to a knife width, may be an optical sensor also known as such. This type of sensor may include a light source, usually a laser, placed opposite a photoelectric detector, i.e. in this case on the opposite side of the passing knives 2. The light source can generate light within or outside the visible spectrum, including infrared. Such sensors are also called photoelectric sensors. Other optical sensors include a light source on the same side of the detector, the latter being configured to detect light reflected off the detected surface. The advantage of an optical sensor is that it may be placed further away from the knife surfaces compared to an inductive sensor.

A further alternative capable of obtaining a similar signal than the ones obtained by an inductive or optical sensor is a pneumatic proximity sensor.

Figure 7:
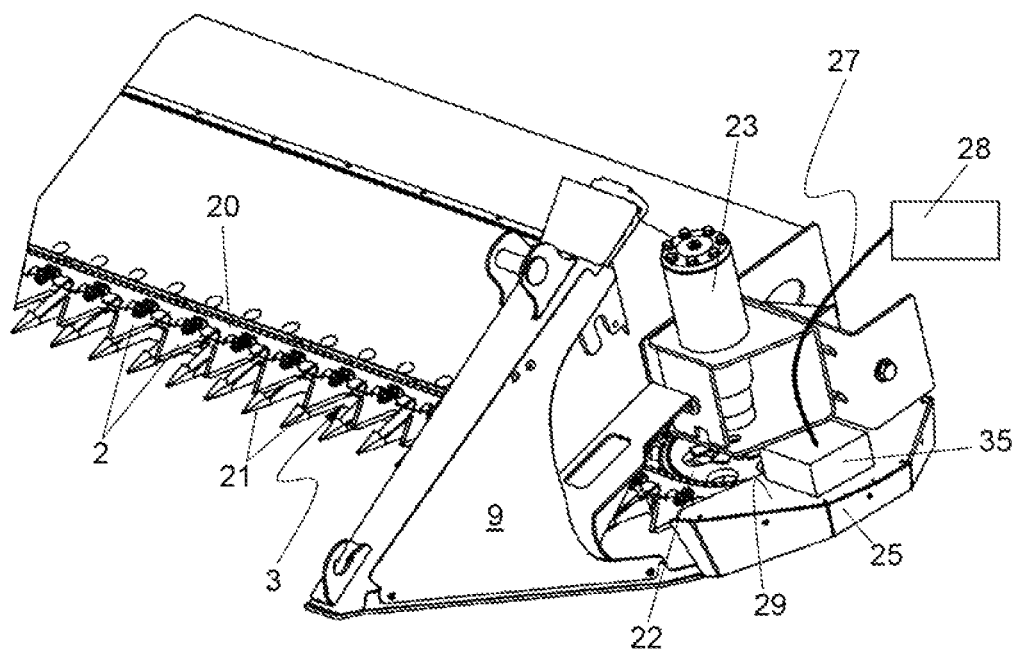
FIG. 7 illustrates an embodiment of the invention wherein the sensing device is a camera.

According to another embodiment, the sensing device is a camera, possibly placed at the same location as the sensor 26 in the above-described embodiments. FIG. 7 shows a camera 35, represented in a simplified way, mounted on the upper surface 29 of the lateral housing 25 and connected by the wire 27 (or alternatively by a wireless connection) to the processing unit 28. Various camera types may be used, including a camera that captures a full image of each knife 2 passing in front of the camera, or a camera that captures only a line image at a given position along the centre line 31 of a knife, or possibly at various positions along the centre line 31. The capture frequency of the camera could be synchronized with the speed of the belt so that each acquired image captures one knife, or a high-frequency camera may be used that allows accurate image acquisition for any realistic belt speed applied during operation of the cutting system. According to an embodiment, a light source may be incorporated in the cutting system, illuminating the knives as they pass before the camera. Possibly, the light source may be a stroboscopic lamp synchronized with the capture frequency of the camera. In the processing unit 28, image processing techniques known in the art may be used for analysing the acquired images and for signalling the detection of damage to one or more knives. Ideally this process includes the comparison of a reference image obtained from a non-damaged knife to the images obtained by the camera

35. Sufficiently fast image processing and analysis tools are available which enable an essentially real-time analysis of the knife condition in this way.

Artificial intelligence can be used to assess the damage and/or state of wear of a knife, for example by using a neural network to classify the images of the knives.

Other locations of the sensing device (either proximity, optical or camera) are possible. A sensing device having appropriate dimensions could be mounted on one of the counterknife fingers 21. A sensor or camera could be mounted on the header frame 15 at a position along the return path of the knives 2. In the case of the header frame shown in FIG. 3, a sensor or camera could be placed on the rib 40 for example.

According to an embodiment, the system further includes a temperature sensor mounted adjacent to the sensing device described above. This may be an infra-red photodiode sensor for example or a thermal camera, also called infrared camera, possibly incorporated in a common housing with the sensor 26 or the camera 35, and configured to measure the temperature of the knife 2 as it passes before said sensor or camera. The temperature signal is transmitted also to the processing unit 28 and processed there to thereby provide additional information on the condition of the knife. The processing of the temperature signal might include deducting the ambient temperature.

The invention is related to the cutting system as such, and to any agricultural implement equipped with the system. This may be a combine harvester, a mower or a tractor equipped with a header provided with the cutting system, or to any other implement to which a loop-knife system is applicable.

What is claimed is:

1. A cutting system that is configured to be driven through a field in order to cut plant stalks at a given distance from the ground, the cutting system comprising:
    a belt-type carrier configured to be guided by a set of pulleys so as to move in a direction transversal to the stalks;
    a plurality of knives attached to a lateral surface of the carrier;
    a cutterbar having a plurality of counterknives configured to remain stationary relative to the knives as the knives move past the counterknives to thereby cut the stalks;
    at least one sensing device mounted at a location along a path of the knives, said location enabling the sensing device to capture a signal or image that is related to one of the knives moving relative to the sensing device; and
    a processing unit for (i) processing the signal or image, (ii) deriving one or more parameters from the signal or image, and (iii) comparing said one or more parameters to a reference, thereby enabling the cutting system to determine the condition of said one of the knives,
    wherein the knives each have upper and lower surfaces,
    wherein the at least one sensing device is configured to detect a presence of said upper or lower surface of the knives,
    wherein the at least one sensing device comprises a plurality of sensors that are each located at a given distance from the carrier, so that when a knife is not damaged or worn, the respective sensor produces a substantially rectangular signal as a function of time, a length of the rectangular signal being a reference length determined by a speed of the carrier and by a width of the knife at said given distance, so that a comparison of the signals obtained from the knives to said reference during operation of the cutting system enables monitoring of the condition of the knives,
    wherein the plurality of the sensors are positioned at different distances from the carrier, so that each sensor of said plurality of sensors produces a signal that is to be compared to a different reference length.

2. The cutting system according to claim 1, wherein the knives have a triangular shape pointing outward from the carrier.

3. The cutting system according to claim 1, wherein each sensor is selected from the group consisting of an inductive proximity sensor, an optical sensor, a photoelectric sensor and a pneumatic proximity sensor.

4. The cutting system according claim 1, wherein each sensor is a camera configured to capture an image of at least part of each knife passing before said camera.

5. The cutting system according to claim 1, wherein the system further comprises a knife position sensing system to relate the parameters derived from the signal or image to a specific knife.

6. The cutting system according to claim 1, wherein at least one of the sensors is positioned in a vicinity of one of the pulleys that changes a direction of the knives from a first direction to a second direction that is opposite the first direction.

7. An agricultural implement comprising the cutting system according to claim 1.

8. A combine harvester comprising a header and the cutting system according to claim 1, with the knives and the cutterbar mounted at a front end of the header.

9. The combine harvester according to claim 8, further comprising an interface configured to communicate data related to the knife condition to an operator using the cutting system.

10. The combine harvester according to claim 8, further comprising a communication unit that is configured to communicate data related to the knife condition to an operator that is located outside of a driver's cabin of the combine harvester.

11. The combine harvester according to claim 10, whereby the data related to the knife condition comprises an average state of wear of the knifes and/or a percentage of damaged knifes.

12. The combine harvester according to claim 8, further comprising a controller that is configured to either slow or stop the cutting system when said one or more parameters derived from the signal or image captured by the sensing device exceeds a certain threshold for a certain number of knives.

13. A cutting system that is configured to be driven through a field in order to cut plant stalks at a given distance from the ground, the cutting system comprising:
    a belt-type carrier configured to be guided by a set of pulleys so as to move in a direction transversal to the stalks;
    a plurality of knives attached to a lateral surface of the carrier;
    a cutterbar having a plurality of counterknives configured to remain stationary relative to the knives as the knives move past the counterknives to thereby cut the stalks;
    at least one sensing device mounted at a location along a path of the knives, said location enabling the sensing device to capture a signal or image that is related to one of the knives moving relative to the sensing device;
    a processing unit for (i) processing the signal or image, (ii) deriving one or more parameters from the signal or image, and (iii) comparing said one or more parameters to a reference, thereby enabling the cutting system to determine the condition of said one of the knives; and a temperature sensor mounted adjacent the sensing device and configured to measure a temperature of one of the knives as said one of the knives passes the sensing device.

14. A combine harvester comprising:
(a) a header;
(b) a cutting system that is configured to be driven through a field in order to cut plant stalks at a given distance from the ground, the cutting system comprising:
  (i) a belt-type carrier configured to be guided by a set of pulleys so as to move in a direction transversal to the stalks,
  (ii) a plurality of knives attached to a lateral surface of the carrier,
  (iii) a cutterbar having a plurality of counterknives configured to remain stationary relative to the knives as the knives move past the counterknives to thereby cut the stalks, wherein the plurality of knives and the cutterbar are mounted at a front end of the header,
  (iv) at least one sensing device mounted at a location along a path of the knives, said location enabling the sensing device to capture a signal or image that is related to one of the knives moving relative to the sensing device, and
  (v) a processing unit for (i) processing the signal or image, (ii) deriving one or more parameters from the signal or image, and (iii) comparing said one or more parameters to a reference, thereby enabling the cutting system to determine the condition of said one of the knives; and
(c) an interface configured to communicate data related to the knife condition to an operator using the cutting system, whereby the data related to the knife condition comprises an average state of wear of the knifes and/or a percentage of damaged knifes.

* * * * *